(12) United States Patent
Juranitch

(10) Patent No.: US 12,162,779 B2
(45) Date of Patent: Dec. 10, 2024

(54) SIMULTANEOUS OPTIMIZATION OF FUEL ENERGY, SITE OPEX, WASTE HEAT RECOVERY AND DIRTY WATER TREATMENT

(71) Applicant: HEAT IP HOLD CO, LLC, Aberdeen (GB)

(72) Inventor: James C. Juranitch, Fort Lauderdale, FL (US)

(73) Assignee: HEAT IP HOLD CO, LLC, Aberdeen (GB)

( * ) Notice: Subject to any disclaimer, the term of this patent is extended or adjusted under 35 U.S.C. 154(b) by 244 days.

(21) Appl. No.: 17/291,865

(22) PCT Filed: Nov. 8, 2019

(86) PCT No.: PCT/US2019/060409
§ 371 (c)(1),
(2) Date: May 6, 2021

(87) PCT Pub. No.: WO2020/097427
PCT Pub. Date: May 14, 2020

(65) Prior Publication Data
US 2022/0127166 A1   Apr. 28, 2022

Related U.S. Application Data

(60) Provisional application No. 62/757,621, filed on Nov. 8, 2018.

(51) Int. Cl.
*C02F 1/16* (2023.01)
*B01D 1/00* (2006.01)
(Continued)

(52) U.S. Cl.
CPC ............. *C02F 1/16* (2013.01); *B01D 1/0058* (2013.01); *B01D 1/14* (2013.01); *B01D 1/30* (2013.01);
(Continued)

(58) Field of Classification Search
CPC ...... C02F 1/10; C02F 1/16; C02F 1/38; C02F 2103/10; C02F 2303/10; B01D 1/0058; B01D 1/14; B01D 1/30
See application file for complete search history.

(56) References Cited

U.S. PATENT DOCUMENTS 5,512,142 A * 4/1996 Hoiss ................. C02F 1/38
203/1
8,182,684 B1 * 5/2012 Wu ..................... B04C 9/00
209/733
(Continued)

FOREIGN PATENT DOCUMENTS

WO   2018/152463 A1   8/2018
WO   2018/152464 A1   8/2018

*Primary Examiner* — Jonathan Miller
(74) *Attorney, Agent, or Firm* — LAW OFFICE OF JESSE D. LAMBERT, LLC

(57) ABSTRACT

Embodiments of the present disclosure relate generally to a system for simultaneous optimization of fuel energy, site Opex costs, waste heat recovery and the coincidental cleaning and treatment of dirty water. The system can include a waste heat source that generates waste heat. The system can include a hydrocyclone coupled with the waste heat source, wherein the waste heat is injected into the hydrocyclone.

8 Claims, 3 Drawing Sheets

(51) Int. Cl.
  *B01D 1/14* (2006.01)
  *B01D 1/30* (2006.01)
  *C02F 1/10* (2023.01)
  *C02F 1/38* (2023.01)
  *C02F 103/10* (2006.01)

(52) U.S. Cl.
  CPC ................. *C02F 1/10* (2013.01); *C02F 1/38* (2013.01); *C02F 2103/10* (2013.01); *C02F 2303/10* (2013.01)

(56) References Cited

U.S. PATENT DOCUMENTS

| | | | |
|---|---|---|---|
| 8,623,174 B1* | 1/2014 | Duesel, Jr. | B01D 1/14 |
| | | | 261/77 |
| 8,789,601 B2 | 1/2014 | Broussard et al. | |
| 9,140,110 B2 | 9/2015 | Coli et al. | |
| 9,199,861 B2* | 12/2015 | Duesel, Jr. | B01D 1/14 |
| 10,508,044 B2* | 12/2019 | Wilson | B01D 1/0094 |
| 10,513,444 B1* | 12/2019 | Sherry | E21B 41/00 |
| 11,649,174 B2* | 5/2023 | Schleiffarth | C02F 1/041 |
| | | | 202/176 |
| 2003/0116506 A1 | 6/2003 | Lane | |
| 2005/0247647 A1 | 11/2005 | Hills | |
| 2011/0061816 A1 | 3/2011 | Duesel, Jr. et al. | |
| 2011/0174447 A1* | 7/2011 | Duesel, Jr. | C02F 1/10 |
| | | | 159/4.05 |
| 2015/0360971 A1 | 12/2015 | Schleiffarth | |
| 2016/0145122 A1* | 5/2016 | Wilson | B01D 21/267 |
| | | | 202/83 |

\* cited by examiner

SIMULTANEOUS OPTIMIZATION OF FUEL ENERGY, SITE OPEX, WASTE HEAT RECOVERY AND DIRTY WATER TREATMENT

CROSS-REFERENCE TO RELATED APPLICATIONS

This application is a national stage filing based upon international application no. PCT/US2019/060409, filed 8 Nov. 2019 and published in on 14 May 2020 under international publication no. WO 2020/097427 (the '409 application). This application claims the benefit of U.S. provisional application No. 62/757,621, filed 8 Nov. 2018 (the '621 application). The '409 application and the '621 application are both hereby incorporated by reference as though fully set forth herein.

FIELD OF THE INVENTION

Embodiments of the present disclosure relate generally to a method, apparatus and system for the simultaneous optimization of fuel energy, site operational expenditure (Opex) costs, waste heat recovery and the coincidental cleaning and treatment of dirty water.

BACKGROUND

Cleaning up contaminated water from any source is becoming a bigger issue, as the world attempts to evolve to a Zero Liquid Discharge (ZLD) philosophy. Many industries are challenged by the economics of ZLD. The Hydraulic Fracturing hydrocarbon recovery process has proven to be an effective way of recovering fossil energy. However, it is not without negative issues, especially related to contaminated water disposal. One of the undesirable traits of the process is its need for large quantities of water in the beginning of the process. A typical well will require many millions of gallons of water in the beginning (i.e., injection) part of a fracing process. This will require large amounts of energy to pressurize and inject this large quantity of water.

There is a larger disposal requirement to dispense with fossil water or salt laden brine water which is returned during the balance of the hydrocarbon recovery process. This fossil water is known as "produced water" and contains large amounts of salts. In some cases, the amount of salt contained in the produced water can be over 200,000 parts per million (ppm) of salts. To date, the most prevalent practice for produced water disposal is deep well injection. The produced water is effectively pumped deep into the ground. Unfortunately, it appears this process has precipitated seismic events or earth quakes in a number of locations, field and well over pressurization, well souring, and/or well cross contamination. Deep well injection can also be very costly in most basins.

It is typical in today's frac sites to utilize diesel engines to drive the frac pumps for water injection. These pumps force in some cases over 6 million (MM) gallons of fluid into a well to be fracked at a very high pressure sometimes exceeding 10,000 pounds per square inch (PSI). The frac pump power required on some of today's lateral frac wells can exceed 15,000 horsepower (HP). Typically, diesel driven water pumps are used in this process. Huge amounts of diesel fuel are required to accomplish this process; the fuel must be trucked in at great expense to the frac site; the noise and emissions from this primarily diesel powered frac pump process are undesirably high; and the service requirements for a diesel engine are significant.

A large reduction in fuel energy cost or Opex can be accomplished by generating electricity, ideally from a turbine generator on a frac site using well head gas or natural gas, and then driving the frac pump with an electric motor. This concept is taught in U.S. Pat. Nos. 8,789,601 B2 and 9,140,110 B2, which are incorporated by reference in their entirety as though fully set forth herein. This process is an improvement over diesel driven frac pumps, but the industry can still optimize its frac pumping and water disposal process further.

SUMMARY

Embodiments of the present disclosure relate generally to a system for simultaneous optimization of fuel energy, site Opex costs, waste heat recovery and the coincidental cleaning and treatment of dirty water. The system can include a waste heat source that generates waste heat. The system can include a hydrocyclone coupled with the waste heat source, wherein the waste heat is injected into the hydrocyclone.

Embodiments of the present disclosure relate generally to a system for simultaneous optimization of fuel energy, site Opex costs, waste heat recovery and the coincidental cleaning and treatment of dirty water. The system can include a waste heat source that generates waste heat. The system can include a dirty water injection system made up of one or more orifices, wherein the dirty water injection system injects the dirty water into the waste heat.

Embodiments of the present disclosure relate generally to a system for simultaneous optimization of fuel energy, site Opex costs, waste heat recovery and the coincidental cleaning and treatment of dirty water. The system can include waste heat source that generates waste heat. The system can include a dirty water injection system that includes one or more orifices. The system can include a hydrocyclone, wherein the waste heat is injected into the hydrocyclone and the dirty water injection system is configured to inject the dirty water into the hydrocyclone.

Embodiments of the present disclosure relate generally to a system for simultaneous optimization of fuel energy, site Opex costs, waste heat recovery and the coincidental cleaning and treatment of dirty water. The system can include a waste heat source that generates waste heat, the waste heat source in communication with an exhaust stack, wherein the exhaust stack includes a hydrocyclone and the waste heat is injected into the hydrocyclone. The system can include a dirty water injection system that includes a plurality of orifices, the dirty water injection system configured to inject the dirty water into the hydrocyclone via the plurality of orifices.

DETAILED DESCRIPTION

Embodiments of the present disclosure relate generally to a method, apparatus and system for the simultaneous optimization of fuel energy, site Opex costs, waste heat recovery and the coincidental cleaning and treatment of dirty water. The system, apparatus and method can be used in the enhanced oil recovery industry in processes such as Hydraulic Fracturing, or any other application which requires large quantities of contaminated water to be treated.

It can also recycle or optimize waste heat re-use from any source such as a diesel engine, gas engine, turbine, asphalt plant, cement plant or any other consistent heat source. An effective method of produced and contaminated water disposal is taught in PCTUS2018/018614, titled Dirty Water Distillation and Salt Harvesting System, Method, and Apparatus, which is incorporated by reference as through fully set forth herein. An effective method of produced and contaminated water disposal is further taught in PCT/US2018/018615, titled Large Scale Cost Effective Direct Steam Generator System, Method, and Apparatus, which is incorporated by reference as through fully set forth herein. This application utilizes a direct contact steam generator known in the industry as a Direct Contact Thermal Distillation™ or DCTD™ system. In some cases, the technology employed in the DCTD™ system can be combined with other technologies, such as Reverse Osmosis (RO), when the Total Dissolved Solids (TDS) and other contaminants are compatible.

Process fuel optimization can be accomplished by utilizing cleaner and/or lower cost per British Thermal Unit (BTU) fuels, such as natural gas, compared to diesel fuel, to operate a primary heat generating process to then harvest and utilize the waste heat, as further discussed in embodiments of the present disclosure.

Figure 1:
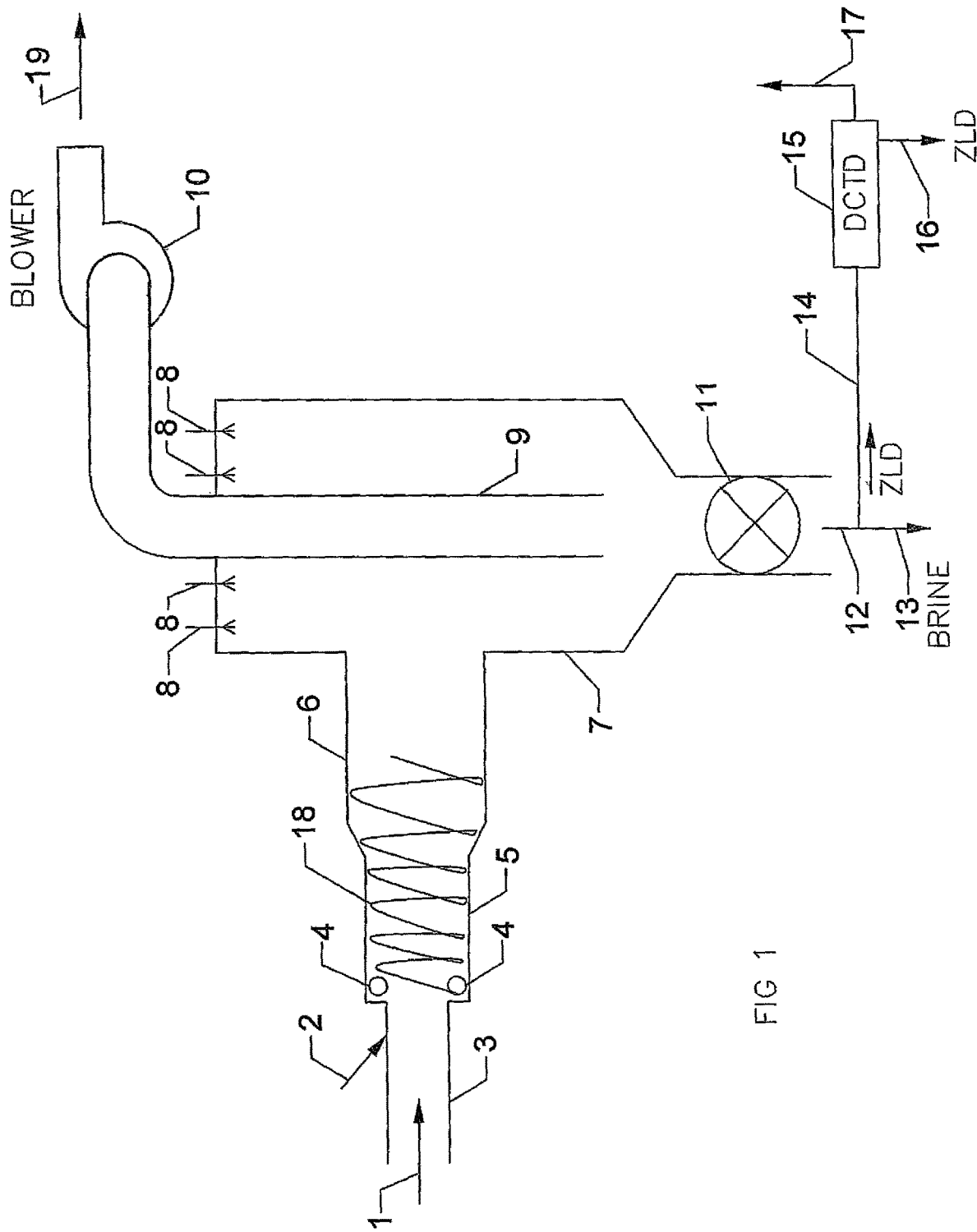
FIG. 1 depicts a simplified schematic representation of an embodiment for simultaneous optimization of fuel energy, site Opex costs, waste heat recovery and the coincidental cleaning and treatment of dirty water, in accordance with embodiments of the present disclosure.

FIG. 1 depicts a simplified schematic representation of an embodiment for optimization of fuel energy, site Opex costs, waste heat recovery and the coincidental cleaning and treatment of dirty water, in accordance with embodiments of the present disclosure. A waste heat flow 1 can be provided via a duct 3. A preferred example can be an outlet flow that includes waste heat from a natural gas fired electrical generating turbine in the duct 3. However, the waste heat flow 1 can come from other processes, as well, such as a diesel engine, a gas engine, asphalt plant, cement plant, etc. Accessary duct fire heat augmentation or burning can optionally be coupled to the process and injected via the duct 3 by a heat augmentation duct 2. The waste heat is in communication with the Direct Contact Thermal Distillation™ device as taught in PCTUS2018/018614 and PCT/US2018/018615, shown as structure 5. Structure 5, as shown, is a cylinder which provides the structure to contain the generated vortex of fluid referred to as a hydrocyclone. The waste heat injected via the duct 3 is further in communication with a hydrocyclone, shown as hydrocyclone 18. Dirty water can be injected into the hydrocyclone 18 from injection dirty water orifices 4, which could be as few as 1 orifice or as many as 25 orifices. Preferably, the number of orifices can range from 2 to 5 orifices. Further aspects of the hydrocyclone 18 are taught in PCT/US2018/018615, titled Large Scale Cost Effective Direct Steam Generator System, Method, and Apparatus, which is incorporated by reference as through fully set forth herein.

If a turbine is used as a waste heat source, the high mass flow and velocity in the waste heat flow injected via the duct 4, combined with a turbine's adverse sensitivity to exhaust gas pressure (e.g., backpressure) can be advantageously served by an increasing diameter over the length of the DCTD™ device as shown in duct 6. The increasing diameter can reduce the exhaust gas pressure of the turbine. If an example of a Taurus™ 60 gas turbine, commercially available from Solar Turbines Incorporated, is analyzed for its waste heat harvesting; approximately ⅔ of the energy in the waste heat will be advantageously transferred into processing of the dirty water that is injected from the dirty water orifices 4 into the hydrocyclone 18. The heat transfer in this hydrocyclone 18 will convert the dirty water to steam, which can be vaporized by heat transfer to the hydrocyclone 18 and travel through cyclonic separator 7, which can separate brine and/or particles from the steam. The steam can continue through a steam outlet conduit 9. A pressure reducing blower 10 can be optionally included in the system before steam exit 19. The optional pressure reducing blower 10 can further reduce the exhaust gas pressure in the system, mitigating negative operational side effects associated with an increased exhaust gas pressure when the system is used in conjunction with a turbine.

Optionally the steam vapor at location 19 could be condensed and re-used as distilled water. The condensing function is further taught in PCTUS2018/018614 and PCT/US2018/018615, which are both incorporated by reference as though fully set forth herein. When the system is used in conjunction with a Taurus™ 60 gas turbine, the amount of dirty water that can be processed using waste heat from the Taurus™ 60 gas turbine can be approximately 1800 barrels per day. This processing of dirty water using waste heat generated from a gas turbine will have a significant advantageous effect on site Opex, where contaminated water destruction is desired. Separated particles can collect due to gravity in the bottom of the cyclonic separator 7 and can be extracted through valve 11 (e.g., sector valve), if a Zero Liquid Discharge (ZLD) system function is desired. A brine or effluent concentrate could also be discharged through sector valve 11 or a gate valve (not shown for clarity) and can exit out of outlet 12 as brine shown at location 13. In some embodiments, the brine and/or concentrated effluent solution can be further processed by traveling through conduit 14 to a ZLD process or further concentrate function using a second DCTD™ device 15 with its function as taught in PCTUS2018/018614 and PCT/US2018/018615, which are hereby incorporated by reference as though fully set forth herein. In DCTD™ device 15, solids can be rejected out of conduit 16 and steam vapor or condensed distilled water can exit from conduit 17 (condenser not shown for ease of illustration).

Optional injection orifices 8 in cyclonic separator 7 can be used to inject dirty water into this process for steam generation. In some embodiments, the injection orifices can be the only point of dirty water injection into the process or they could be used in parallel with the orifices 4, which are used to develop the hydrocyclone.

Figure 2:
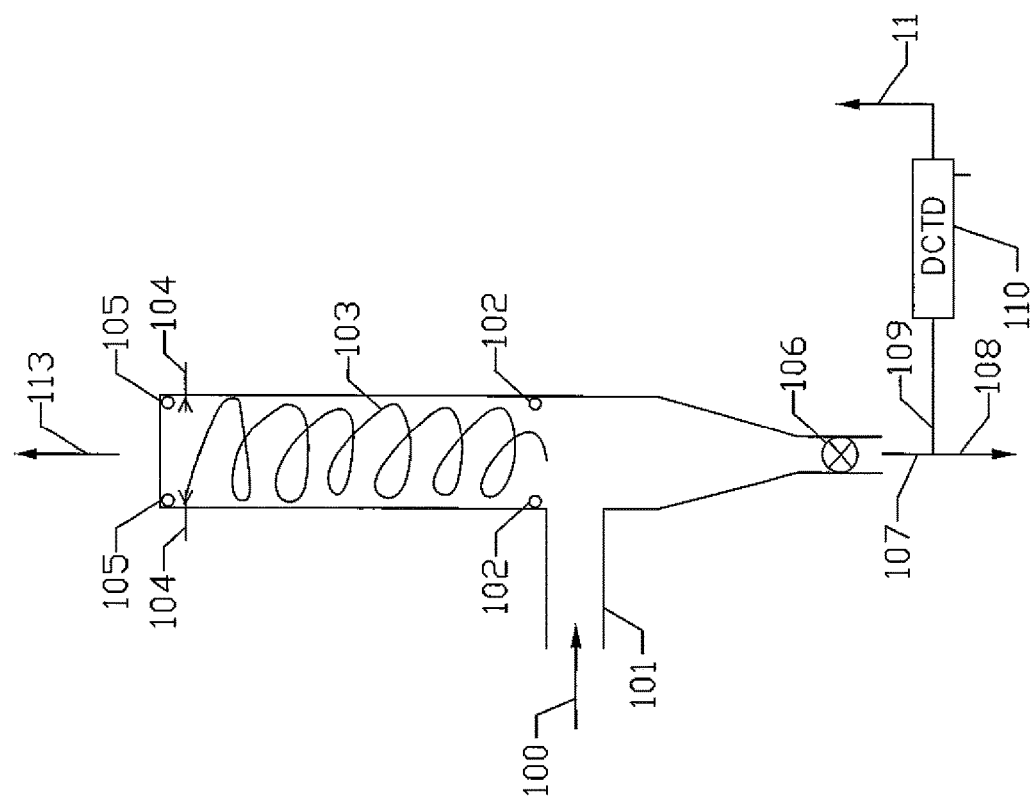
FIG. 2 depicts a second simplified schematic representation of an embodiment for simultaneous optimization of fuel energy, site Opex costs, waste heat recovery and the coincidental cleaning and treatment of dirty water, in accordance with embodiments of the present disclosure.

FIG. 2 depicts a simplified schematic representation of a second embodiment for optimization of fuel energy, site Opex costs, waste heat recovery and the coincidental cleaning and treatment of dirty water, in accordance with embodiments of the present disclosure. In some embodiments, a waste heat flow 100 can be provided via a duct 101. A preferred example can be an outlet flow that includes waste heat from a natural gas fired electrical generating turbine in the duct 101. However, the waste heat flow 100 can come from other processes, as well, as previously mentioned. Accessary duct fire heat augmentation or burning can optionally be coupled to the process and injected via the duct 101 (not shown for clarity). The waste heat flow 100 can be in communication with an exhaust stack and dirty water hydrocyclone 103 via the duct 101. In some embodiments, dirty water can be injected into the hydrocyclone 103 from dirty water orifices 102. The orifices could be as few as 1 orifices or as many as 25 but preferably the orifices can range in a number from 2 to 5 orifices. The hydrocyclone 103 can be concurrent with exhaust flow using orifices 102 and/or counter to exhaust waste heat flow using orifices 105. Further aspects of the hydrocyclone 103 are taught in PCT/US2018/018615, titled Large Scale Cost Effective Direct Steam Generator System, Method, and Apparatus, which is incorporated by reference as through fully set forth herein.

The generated steam is expelled at expelled steam location 113. Optionally the steam vapor at expelled steam location 113 can be condensed and re-used as distilled water. The condensing function is taught in PCTUS2018/018614, which is incorporated by reference as though fully set forth herein. In some embodiments, the particles can collect due to gravity in a bottom of the exhaust stack and can be extracted through valve 106 (e.g., sector valve), if a Zero Liquid Discharge (ZLD) system function is desired. A brine or effluent concentrate could also be discharged through sector valve 106 or a simple gate valve (not shown for clarity) and exit out of outlet 107 as brine shown at location 108 or the solution could be further processed by traveling through conduit 109 to a ZLD process or further concentrate using a second DCTD™ device 110 with its function, as taught in PCTUS2018/018614 and PCT/US2018/018615, which can produce solids from conduit 111 and steam or distilled water from conduit 112 (condenser not shown for ease of illustration).

Optional injection orifices 104 in the exhaust stack could be used to inject dirty water into this process for steam generation. They could be the only point of dirty water injection into the process or they could be used in parallel with the orifices 105 and/or 102, which are used to develop the hydrocyclone.

Figure 3:
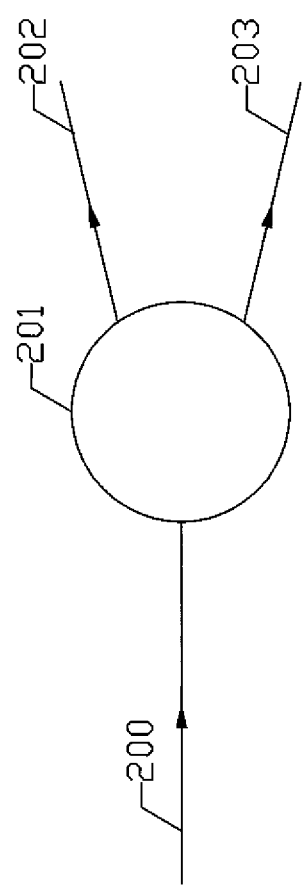
FIG. 3 depicts a manifold system, in accordance with embodiments of the present disclosure.

FIG. 3 depicts a manifold system which could be utilized in embodiments of the present disclosure. In some embodiments, a waste heat is in communication through duct 200 and can be communicated with distribution manifold 201. Two or more outlet conduits 202 and 203 can be in communication with two or more ducts, such as duct 3, which is further depicted and discussed in relation to FIG. 1, or such as duct 101, which is further depicted and discussed in relation to FIG. 2.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although at least one embodiment for a dirty water treatment optimization has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed:

1. A system comprising:
    a waste heat source that generates waste heat; and
    a hydrocyclone coupled with the waste heat source, wherein the waste heat is injected into the hydrocyclone, followed by a cyclonic separator and wherein the hydrocyclone is cylindrical having a circular cross-section over a length, the length being from an injection point of the waste heat source to an exit point of the hydrocyclone at an entry point of the cyclonic separator, and a diameter of the hydrocyclone circular cross-section increases over a length of the hydrocyclone.

2. The system of claim 1, wherein the waste heat source is at least one of a turbine, internal combustion engine, consistent heat source, and a manufacturing plant.

3. The system of claim 1, wherein an exhaust blower is disposed downstream of the hydrocyclone and is used to reduce a pressure in the hydrocyclone.

4. The system of claim 1, wherein the waste heat is distributed through a manifold and two or more ducting systems.

5. The system of claim 1, wherein the dirty water is processed into at least one of a concentrated brine or further processed into a Zero Liquid Discharge and particle separation system.

6. The system of claim 1, wherein a hydrocyclone flow of the hydrocyclone is concurrent or counterflow to a stream of the waste heat.

7. A system comprising:
a waste heat source that generates waste heat;
a dirty water injection system made up of one or more orifices, wherein the dirty water injection system injects the dirty water into the waste heat; and
a hydrocyclone coupled with the waste heat source, wherein the waste heat is injected into the hydrocyclone, followed by a cyclonic separator and wherein the hydrocyclone is cylindrical having a circular cross-section over a length, the length being from an injection point of the waste heat to an exit point of the hydrocyclone at an entry point of the cyclonic separator, and a diameter of the hydrocyclone circular cross-section increases over a length of the hydrocyclone.

8. A system comprising:
a waste heat source that generates waste heat;
a dirty water injection system that includes one or more orifices; and
a hydrocyclone coupled with the waste heat source, wherein the waste heat is injected into the hydrocyclone, followed by a cyclonic separator and the dirty water injection system is configured to inject the dirty water into the hydrocyclone, and wherein the hydrocyclone is cylindrical having a circular cross-section over a length, the length being from an injection point of the waste heat to an exit point of the hydrocyclone at an entry point of the cyclonic separator, and a diameter of the hydrocyclone circular cross-section increases over a length of the hydrocyclone.

* * * * *